United States Patent [19]

Thorncraft et al.

[11] Patent Number: 5,015,058
[45] Date of Patent: May 14, 1991

[54] ASYMMETRIC FIBRE OPTIC COUPLERS AND THEIR FABRICATION

[75] Inventors: David A. Thorncraft, Isabella Plains; Peter R. A. Lyons, Kaleen; Scott C. Rashleigh, Waniassa; Johnathan A. Maine, Mawson; John D. Love, Flynn, all of Australia

[73] Assignee: The Commonwealth of Australia, Australia

[21] Appl. No.: 334,381

[22] PCT Filed: Jun. 6, 1988

[86] PCT No.: PCT/AU88/00174
§ 371 Date: Feb. 2, 1989
§ 102(e) Date: Feb. 2, 1989

[87] PCT Pub. No.: WO88/09943
PCT Pub. Date: Dec. 15, 1988

[30] Foreign Application Priority Data

Jun. 5, 1987 [AU] Australia .......................... PI2342/87
Dec. 4, 1987 [AU] Australia .......................... PI5750/87

[51] Int. Cl.$^5$ .............................................. G02B 6/26
[52] U.S. Cl. .................................... 350/96.15; 65/4.2; 350/320
[58] Field of Search ............... 350/96.15, 96.16, 96.20, 350/96.21, 96.22, 96.29, 320; 65/4.1, 4.2, 4.3

[56] References Cited

U.S. PATENT DOCUMENTS

| 3,535,017 | 10/1970 | Miller . | |
| 4,243,296 | 1/1981 | Aulich et al. | 350/96.15 |
| 4,291,940 | 9/1981 | Kawasaki et al. | 65/4.2 X |
| 4,315,666 | 2/1982 | Hicks . | |
| 4,342,499 | 8/1982 | Hicks . | |
| 4,402,568 | 9/1983 | Kulich et al. . | |
| 4,433,896 | 2/1984 | Frazier . | |
| 4,586,784 | 5/1986 | Tremblay | 350/96.15 |
| 4,746,185 | 5/1988 | Shahidi-Hamedani | 350/96.15 |
| 4,798,436 | 1/1989 | Mortimore | 350/96.15 |

FOREIGN PATENT DOCUMENTS

| 3005646 | 8/1981 | Fed. Rep. of Germany . |
| 1425681 | 2/1976 | United Kingdom . |
| 2038017 | 7/1980 | United Kingdom . |

Primary Examiner—John D. Lee
Attorney, Agent, or Firm—Saidman, Sterne, Kessler & Goldstein

[57] ABSTRACT

An asymmetric multi-mode fibre optic coupler is assembled from two or more multi-mode optical fibres of different core and cladding diameters but substantially equal cladding refractive indices. The fibres are selected so as to have substantially equal effective refractive indices for their respective highest-order cladding modes, at least in the fabricated coupler.

15 Claims, 3 Drawing Sheets

STEP F

STEP A

STEP B

STEP C

STEP D

STEP E

STEP F

ASYMMETRIC FIBRE OPTIC COUPLERS AND THEIR FABRICATION

BACKGROUND OF THE INVENTION

This invention relates generally to fiber optic couplers, and is concerned in particular with the fabrication of asymmetric fiber optic couplers The simple symmetric fiber optic coupler, in which input light at any branch is split substantially equally between output branches, has little practical application to linear fiber optic buses and networks since only a trivial number of taps are possible before optical signal strengths become impracticably small. Larger linear fiber optic networks require asymmetric couplers in which tap-off coupling is substantially less than half, but tap-on coupling is much greater than the tap-off coupling. In the context of this specification, the terms "asymmetric coupler" and "asymmetric coupling" refer to coupling asymmetry of this kind. Such a requirement arises, for example, in networks where each component tied to a bus includes both an optical transmitter and an optical receiver, the receiver tapping the bus in front of the tap for the transmitter.

It has been proposed that asymmetric couplers having, e.g. a throughput power coupling factor, e.g. on a bus, of 95 and a tap-off coupling factor of 1.5%, might be fabricated by employing conventional techniques to merge two optical fibers of substantially different diameters or by simply reducing the nominal coupling factor of two similar fibers. The resultant couplers are satisfactory for single-mode applications, e.g. in basic telecommunication systems, but unacceptable for multi-mode operation because of significant power losses and the restricted proportion of modes which successfully couple to and from the tap fibers

SUMMARY OF THE INVENTION

It is accordingly an object of the invention to provide asymmetric multi-mode fiber optic couplers which exhibit better coupling properties than those hitherto produced.

The invention accordingly provides a method of fabricating an asymmetric multi-mode fiber optic coupler comprising assembling the coupler from two or more multi-mode optical fibers of different core and cladding diameters but substantially equal cladding refractive indices, and wherein the fibers are selected so as to have substantially equal effective refractive indices for their respective highest order cladding modes, at least in the fabricated coupler.

The invention further provides an asymmetric multi-mode fiber optic coupler having at least four optical fiber branches of at least two different core and cladding diameters but substantially equal cladding refractive indices, wherein the fiber branches further have substantially equal effective refractive indices for their respective highest order cladding modes. In one embodiment, the invention affords a coupler fabricated by the aforedescribed method.

If the cladding refractive indices of the fibers are not similar, high order core modes of the fiber having the lower cladding refractive index will be unable to couple to corresponding core modes of the other fiber and will be lost. By matching the cladding refractive indices and the effective refractive index of the highest cladding modes, the effective refractive index of each core mode of each fiber will lie above the cladding refractive index but below the core refractive index of the other fiber. Equilibration of $n_e$'s in both fibers is required to minimize the coupler excess loss and maximize the mode coupling between the fibers in the coupling region.

In order to fabricate an asymmetric multi-mode fiber optic coupler having a predetermined or predictable power coupling factor, the method of the invention preferably further includes selecting the optical fibers in regard to their numerical apertures NA, and their core-to-cladding radii ratios $\rho_{co}/\rho_{cl}$ and subjecting the fibers to respective taper ratios T, so that, on assembly of the fibers to form the coupler, the products $$(T^2 - 1)\frac{NA^2}{\rho_{co}^2/\rho_{cl}^2}$$

for the respective fibers are at least momentarily equal, and wherein the assembly is thereupon completed.

In one embodiment, the values of NA and $\rho_{co}/\rho_{cl}$ differ for the respective fibers and one of the fibers is subjected to a pretapering before the fibers are drawn and thereby tapered together, whereby the values of T vary for the fibers in a manner to ensure equality of said products According to another embodiment, the optical fibers further have similar peak core refractive indices. Two fibers of different core diameters formed in similar material, e.g. silica, generally have a similar cladding refractive index (that for doped silica) but quite different peak core refractive indices and this difference prevents or at least substantially diminishes proper coupling of significant core modes input on any branch of a coupler formed from the fibers In particular, important lower order modes input on a main branch (i.e., the wider fiber) will have effective refractive indices above the refractive index of the tap branch and be unable to couple to the core of the tap branch as a general rule, the peak core refractive indices of commercial optical fibers increase with core diameter. This is a natural consequence of the depositing technique by which the fiber cores are formed and of the resultant parabolic refractive index profile across the core cross-section.

DETAILED DESCRIPTION OF THE PREFERRED EMBODIMENTS

Figure 1:
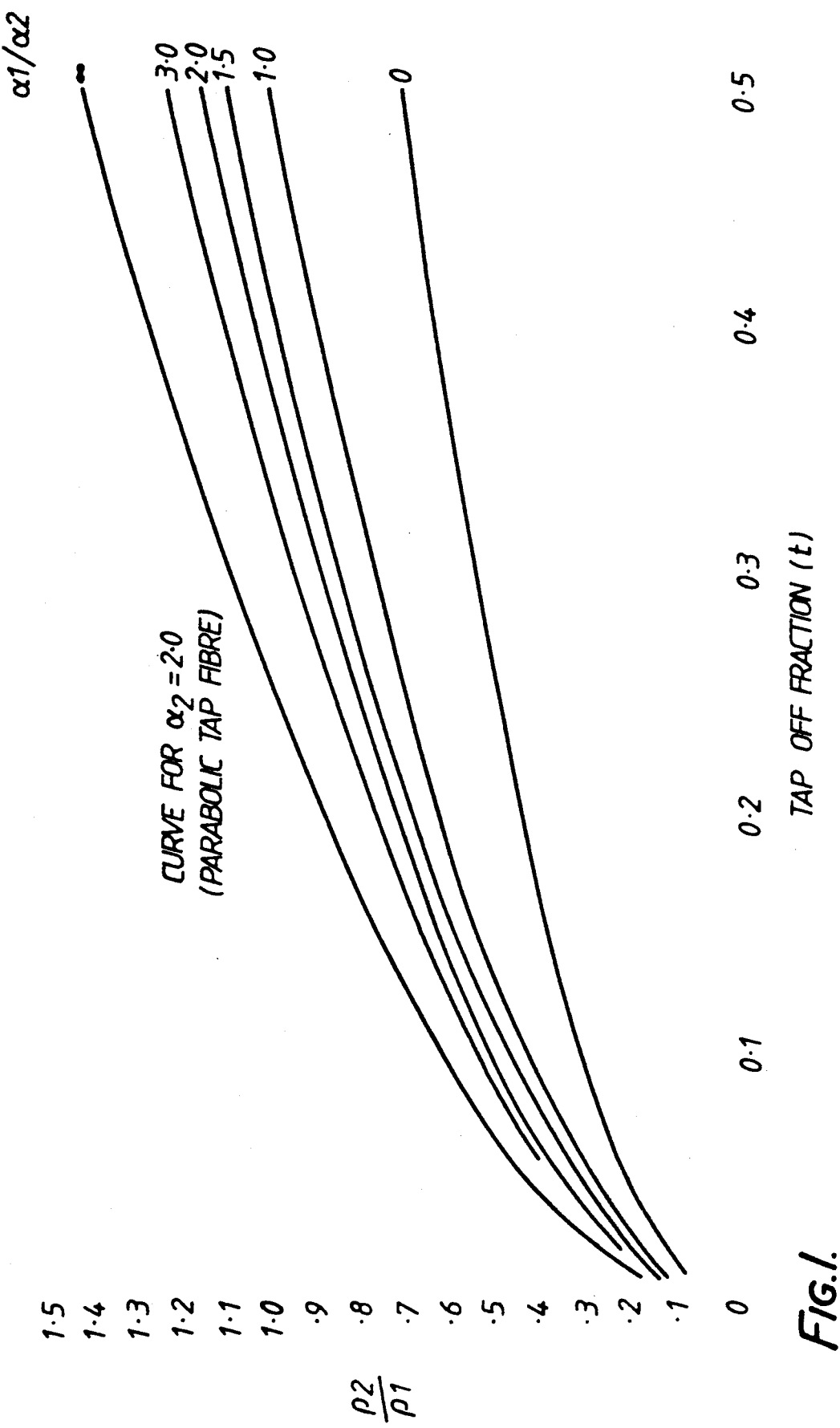
FIG. 1 is an exemplary graphical expression of the relationship of the various parameters at different $\alpha_1$ values for $\alpha_2 = 2.0$.
Figure 2A:
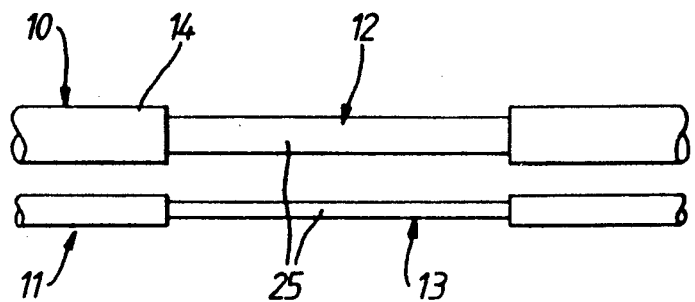
FIG. 2A is a diagrammatic representation of STEP (A) of a manufacturing process in connection with preferred embodiment of the present invention.
Figure 2B:
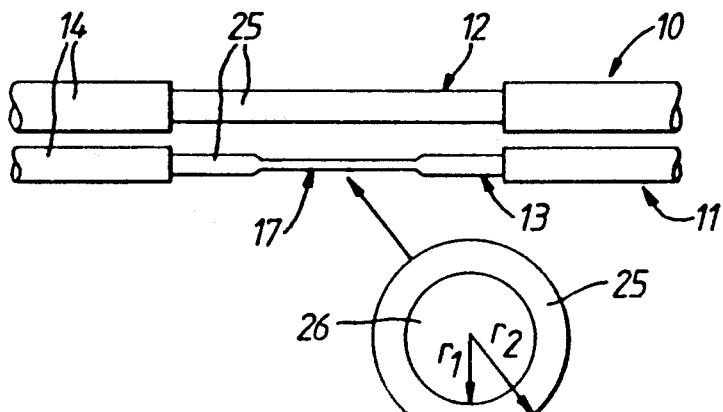
FIG. 2B is a diagrammatic representation of STEP (B) of a manufacturing process in connection with a preferred embodiment of the present invention.
Figure 2C:
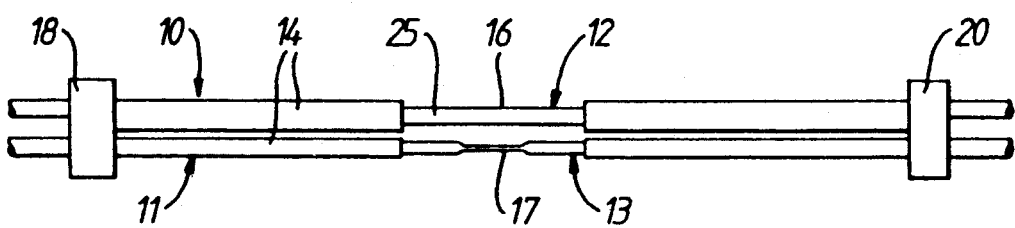
FIG. 2C is a diagrammatic representation of STEP (C) of a manufacturing process in connection with a preferred embodiment of the present invention.
Figure 2D:
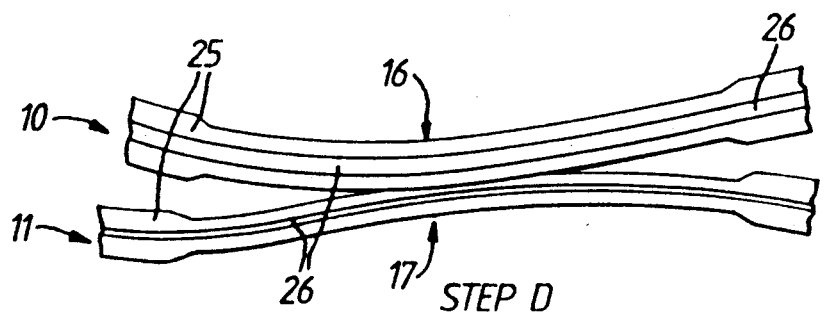
FIG. 2D is a diagrammatic representation of STEP (D) of a manufacturing process in connection with a preferred embodiment of the present invention.
Figure 2E:
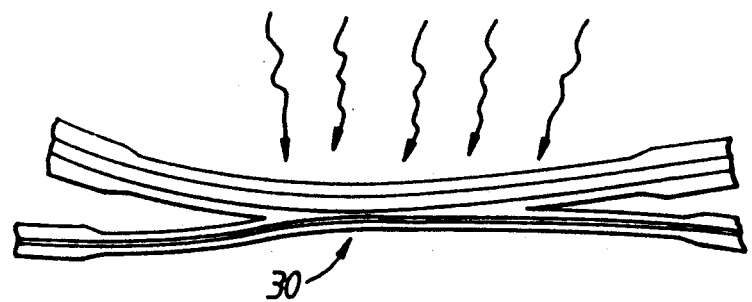
FIG. 2E is a diagrammatic representation of STEP (E) of a manufacturing process in connection with a preferred embodiment of the present invention.
Figure 2F:
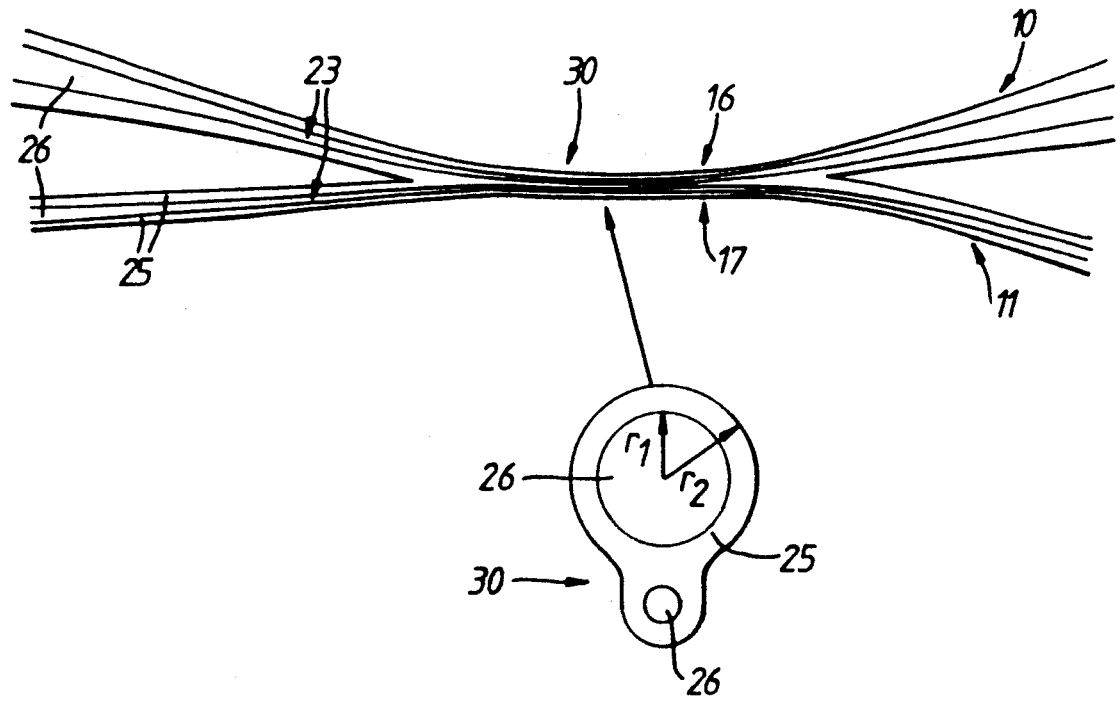
FIG. 2F is a diagrammatic representation of STEP (F) of a manufacturing process in connection with a preferred embodiment of the present invention.

When optical fibers of different core diameters are formed in like material, e.g. silica cladding and a germanium-doped silica core, the requirement of equal peak cladding and equal peak core refractive indices will typically be met when the fibers have equal numerical apertures It is known that the numerical aperture of an optical fiber is dependent on the level of doping in the core, e.g. germanium doping of a silica core.

For silica optical fibers, the numerical aperture (NA) is preferably in the range 0.2 to 0.5. A higher NA, i.e. in this range, is generally desirable because losses at a bend in an optical fiber decrease with increasing numerical aperture The coupler may be any of several known types, e.g. fused biconical taper couplers, polished couplers, couplers draw down in an outer wrapping, and drawn down twin-core couplers However, the coupler is preferably a fused biconical coupler. In this case, however, it is found that even when using optical fibers of similar core refractive indices and similar cladding refractive indices, significant higher order core modes of one of the fibers, which should couple to the core of the other fiber, are lost. In accordance with a second aspect of the invention, it has been appreciated that this effect arises from the tapering step in the coupler fabrication process and must be countered by proper selection and/or preparation of fibers.

There are two limits in quantifying the power coupling factor t, depending on assumptions about the behavior of modes in the coupler. If every mode of the coupler traverses the length of the taper purely adiabatically, then there is no coupling between coupler modes If the numerical aperture of one fiber entering the coupler is filled, there will be equal excitation of all the modes of the other fiber which have a common effective index. For example, suppose the fibers have the same numerical aperture and the main or bus fiber supports $N_1$ modes and the tap-off or branch fiber $N_2$ modes, with $N_1$ ( $N_2$. There are $N_2$ modes of the bus fiber which will share power with the $N_2$ modes of the tap-off fiber. Accordingly the tap-off ratio is ($\frac{1}{2} N_2/N_1$). Similarly, the $N_2$ modes of the tap-on fiber will share their power with $N_2$ modes of the bus fiber, so that the tap-on ratio is $\frac{1}{2}$. Furthermore, the wrap-around ratio is also $\frac{1}{2}$.

In a wholly non-adiabatic coupler, on the other hand, every mode couples with every other mode. This means that whatever the power distribution entering the coupler, it will be shared equally between all modes leaving the coupler Thus, for the two fibers discussed above, if the bus fiber is excited, the power in its $N_1$ modes is shared between the $N_1+N_2$ modes of the coupler. In this case the tap-off ratio must be $N_2/\{N_1+N_2\}$. Similarly, the tap-on ratio is given by $N_1/\{N_1+N_2\}$, and the wrap-around ratio is equal to the tap-off ratio.

A practical coupler is neither purely adiabatic nor non-adiabatic. Neither can there be complete coupling between all modes, since couplers are etched to minimize coupling between core and cladding modes, which must also minimize coupling between the highest-order core modes. Furthermore, as the tapering increases, coupling between all core modes decreases.

Accordingly, the achievable tap-off and tap-on ratios in practical couplers will be bounded, in a sense, by the values for purely adiabatic and non-adiabatic couplers. However, it is found that real behavior is nearer the non-adiabatic limit.

Accordingly, for fabricating an asymmetric multi-mode fiber optic coupler having a predetermined or predictable power coupling factor, the method of the invention further includes selecting the ratio of the core diameters from a first range determined by a first inequality dependent upon said power coupling factor and upon the refractive index profiles of the fiber cores, and selecting the ratio of the cladding diameters from a second range determined by a second inequality dependent upon the power coupling factor but independent of the core diameters and the refractive index profiles.

Advantageously, the coupler is a fused biconical taper fiber optic coupler formed by heating said segments of the fibers while these segments are in intimate side-by-side contact to a temperature sufficient to cause the fiber segments to fuse together, and longitudinally drawing the heated fibers to cause each of the fused fiber segments to develop a biconical taper and so form a coupler.

The optical fiber segments may be segments of respective optical fibers or the method may further include the step of etching one or both of two optical fibers to reduce the cladding diameter(s) to achieve the required ratio.

Both the ratio of the core diameters and the ratio of the cladding diameters may be proportional to the square root of the power coupling factor, with a constant of proportionality of $(2)^{\frac{1}{2}}$, but the core diameter ratio is typically further proportional to a complex factor of the refractive index profile. More particularly, for the most common class of refractive index profiles, the $\alpha$ profiles, defined by:

$$n_2(r) = n_{co}^2 [1 - 2\Delta(r/\rho)^\alpha] \qquad (1)$$

where n(r) is the refractive index at radial distance r from the core axis, $n_{co}$ is the peak core refractive index, $\rho$ is the core radius, and $\Delta$ is the relative index difference given by $$2\Delta = 1 - (n_{cl}/n_{co})^2 \qquad (2)$$

where $n_{cl}$ is the cladding refractive index, the power coupling factor is a power tap-off coupling factor t from a main or bus fiber to a tap or branch fiber, and said first inequality is the following, or an equivalent:

$$\frac{1}{2} \frac{S_2 V_2^2}{S_1 V_1^2} < t < \frac{S_2 V_2^2}{S_1 V_1^2 + S_2 V_2^2} \qquad (3)$$

$$\text{where } S = \frac{1}{2} \frac{\alpha}{\alpha + 2} \qquad (5)$$

$$\text{and } V = \frac{2\pi \rho_{co}}{\lambda} (n_{co}^2 - n_{cl}^2)^{\frac{1}{2}} \qquad (6)$$

the main or bus fiber is indicated by subscript 1 and the tap or branch fiber by subscript 2, and $\lambda$ is the free space wavelength of a prescribed source.

Where the numerical apertures of the fibers are substantially equal, the first and second inequalities may be the following, or equivalents:

$$\frac{1}{2} \frac{s_2}{s_1} \left( \frac{\rho_{co2}}{\rho_{co1}} \right)^2 < t < \frac{(\rho_{co2}/\rho_{co1})^2}{\frac{s_1}{s_2} + (\rho_{co2}/\rho_{co1})^2} \quad (3a)$$

and $$(2t)^{\frac{1}{s}} > \frac{\rho_{cl2}}{\rho_{cl1}} > \left( \frac{t}{1-t} \right)^{\frac{1}{s}} \quad (4a)$$

It can also be demonstrated that the tap-on ratio $t_{ON}$ for this core is given by:

$$\frac{1}{2} \frac{s_1}{s_2} < t_{ON} < \frac{1}{\frac{s_1}{s_2} + \left( \frac{\rho_{co2}}{\rho_{co1}} \right)^2}$$

In the above inequalities, the left-hand limit corresponds to the adiabatic case and the right-hand limit to the non-adiabatic case. The left-hand and right-hand sides of (3) are only equal if $\rho_{co2}=\rho_{co1}$, i.e. the cores are of equal diameter.

It will be appreciated that where the two fibers have similar core refractive index profiles, $s_1=s_2$ and expressions (3) and (4) become the same and the requirement is for the ratio of the core diameters to equal the ratio of the cladding diameters. It will also be appreciated that expressions (3) and (4) sustain one degree of freedom, viz the ratio of core to cladding diameters This may typically be determined by other considerations such as minimum bending loss, fiber rigidity and so forth.

In the practical coupler, the highest-order modes are marginally adiabatic and lower-order modes are certainly non-adiabatic. This suggests that, in the above inequalities, the practically achievable figures for the various ratios are primarily governed by non-adiabatic behavior. In practice then, where a specific power coupling factor is required, the inequalities above are used to select fiber parameters relatively close to the non-adiabatic limit, and the resultant coupler tested for any necessary adjustment.

The invention, in its further aspect, also provides an asymmetric multi-mode fiber optic coupler having a predetermined power coupling factor, formed from two or more multi-mode optical fibers of different core and cladding diameters but substantially equal cladding refractive indices, wherein the fibers further have substantially equal effective refractive indices for their respective highest order cladding modes, and wherein the ratio of the core diameters is selected in dependence upon said power coupling factor and upon the refractive index profiles of the fiber cores and the ratio of the cladding diameters is selected in dependence upon the power coupling factor but is independent of the core diameters and the refractive index profiles.

An exemplary pair of optical fiber segments for the case of similar core refractive index profiles have respective diameters of 200 and 250 micron and respective cladding diameters of 50 and 62.5 micron, a common ratio of 0.8. The former is commercially available; the latter may be produced by etching a length of commercial optical fiber of core diameter 50 micron and cladding diameter 125 micron. This selection results in a coupler exhibiting 95% on-bus coupling between the main or bus branches, i.e. the larger diameter branches, about 1.5% coupling bus to tap branch, and about 80% coupling tap branch to bus.

It is considered that, with asymmetric couplers fabricated according to the principles of the invention, buses or networks of 50 or more taps are quite feasible in view of the lower level of core mode and power losses achieved compared with prior asymmetric couplers Typical electronic buses which may now be directly implemented in optical fiber include IEEE802.3 and IEEE802.4.

The ratio of the core radius to outer cladding radius is preferably selected to achieve a predetermined minimum power loss in the fiber taper regions and core waist regions of the subsequent coupler. The core waist regions of the coupler are the reduced diameter portions of the cores between their tapers For this purpose, the ratio is preferably in the range 0 6 to 0.8, most preferably between 0.67 and 0.77.

Said etching may be effected by immersing the fiber segments in a bath of a suitable acid, for example hydrofluoric acid, for a predetermined time.

The optical fiber segments are preferably brought into said side-by-side intimate contact by being twisted about each other The segments are advantageously initially under tension when being heated.

Said heating and drawing steps are preferably carried out in accordance with international patent application No. PCT/AU87/00374, utilizing apparatus also disclosed therein The method may also incorporate the principles disclosed in international patent application No. PCT/AU87/00380.

It is now proposed to detail the mathematical derivation of expressions (3) and (4).

For convenience, we assume that the core profiles belong to the class of $\alpha$ profiles, defined by equation (1) above:

$$n^2(r) = n_{co}^2 [1 - 2\Delta(r/\rho_{co})^\alpha] \quad (1)$$

over the core $0<r<\rho_{co}$, where $\alpha > 0$, r is the radial distance from the fiber axis, $\rho_{co}$ is the core radius, and $\Delta$ is the relative index difference given by equation (2) above:

$$2\Delta 1 - (n_{cl}/n_{co})^2 \quad (2)$$

The number of bound modes supported by a multi-mode fiber with one of these profiles is given by [7]:

$$N = \frac{V^2}{2} \frac{\alpha}{\alpha + 2} \quad (7)$$

where V is the normalized frequency, defined by:

$$V = \frac{2\pi \rho_{co}}{\lambda} (n_{co}^2 - n_{cl}^2)^{\frac{1}{2}} \quad (6)$$

and $\lambda$ is the free-space wavelength of the source. If we introduce a "mode-number" parameter s into equation (6):

$$N = s V^2 \text{ and } s = \frac{\alpha}{2(\alpha + 2)}$$

then, e.g. $s=\frac{1}{2}$ for the step profile ($\alpha = \infty$) and $s=\frac{1}{4}$ for the parabolic profile ($\alpha = 2$).

Let t be the fraction of power coupled to the tap-off fiber from the throughput fiber. The number of bound modes in the throughput and tap-off fibers is $N_1$ and $N_2$ respectively. As the throughput fiber is larger than the tap-off fiber, $N_1 > N_2$. Under purely adiabatic conditions, only $N_2$ modes couple and, consequently, the fraction of power coupling between the two fibers is $N_2/N_1$. Since a large number of modes is involved, the coupled power will be split equally in the exit ports. Hence the fraction of tap-off power is:

$$t = \tfrac{1}{2} \frac{N_2}{N_1} \tag{8}$$

If we substitute (7) and (5) into (8) and denote the mode-number parameter and the normalized frequency for the throughput and tap-off fibers by $s_1$, $V_1$, and $s_2$, $V_2$, respectively, then:

$$t = \tfrac{1}{2} \frac{s_2}{s_1} \frac{V_2^2}{V_1^2} \tag{9}$$

This is the left-hand side of inequality (3).

In the particular case where the two fibers have the same numerical aperture, it follows from (5) that the ratio of normalized frequencies is given by the corresponding ratio of core radii or diameters Thus:

$$t = \tfrac{1}{2} \frac{s_2}{s_1} \left( \frac{2\rho_{co2}}{2\rho_{co1}} \right)^2 \tag{10}$$

where $2\rho_{co1}$ and $2\rho_{co2}$ are the core diameters of the throughput and tap-off fibers respectively.

This is the left-hand side of inequality (3a) above.

For non-adiabatic behavior, where mixing between modes is complete, power is shared between $N_1 + N_2$ modes.

Thus the tap-off ratio is:

$$t = \frac{N_2}{N_1 + N_2} \tag{8'}$$

Substituting (7) and (5) into (8'):

$$t = \frac{s_2 V_2^2}{s_1 V_1^2 + s_2 V_2^2} \tag{9'}$$

This is the right-hand side of inequality (3).

The number of modes in each fiber is proportional to the square of the core sizes and the mode number parameter s. Then, again taking the case where both fibers have the same numerical aperture:

$$t = \frac{s_2 \rho_{co2}^2}{s_1 \rho_{co1}^2 + s_2 \rho_{co2}^2} \tag{10'}$$

Simplifying: $t = \dfrac{(\rho_{co2}/\rho_{co1})^2}{s_1/s_2 + (\rho_{co2}/\rho_{co1})^2}$ This is the right-hand side of inequality (3a).

Accordingly equations (10) and (10') define the adiabatic and non-adiabatic power tap-off coupling factors respectively such that in a practical situation the actual tap-off coupling factor is given by inequality (3) or (3a).

During tapering, the effective indices of the highest order modes—those with effective indices closest to the cladding index before tapering —must remain identical in the two fibers. Tapering "squeezes" high-order modes from the cores into the cladding, but the total number of excited modes in the core and cladding of the tapered fiber must equal the number of core modes before tapering.

Let T be the taper ratio, defined as:

$$T = \frac{\text{Initial diameter}}{\text{Tapered diameter}} > 1 \tag{11}$$

Mass conservation during tapering requires that T has the same value for the core and cladding diameters of both the throughput and tap-off fibers As we showed above, the initial number of modes N *is proportional to the square of core radius, thus, if $N(T)$ denotes the number of modes remaining in the core at taper ratio T, then:*

$$N(T) = N/T^2 \tag{12}$$

provided $N(T) \gg 1$.

Let $N_{cl}(T)$ the number of modes squeezed into the cladding at taper ratio T. If $\rho_{cl}$ is the cladding radius of the untapered fiber, then the radius of the tapered fiber is $\rho_{cl}/T$. Accordingly, the number of modes in the cladding is equal to the number of modes on a step-profile fiber of diameter $2\rho_{cl}/T$ and numerical aperture $(n_{cl}^2 - n_e^2)^{\frac{1}{2}}$, where $n_e$ is the effective index of the highest-order cladding mode. By analogy with the number of modes in the core of a step-profile fiber, $N = V^2/2$, we have:

$$N_{cl}(T) = 2 \left( \frac{2\pi\rho_{cl}}{\lambda T} \right)^2 (n_{cl}^2 - n_e^2) \tag{13}$$

Invariance of the total number of modes requires:

$$N = N(T) + N_{cl}(T) \tag{14}$$

Substituting from (5) and (12):

$$sV^2 = s\frac{V^2}{T^2} + N_{cl}(T) \tag{15}$$

If we substitute for V from (8) and for $N_{cl}(T)$ from (13), and simplify:

$$2s(T^2 - 1)(n_{co}^2 - n_{cl}^2)\rho_{co}^2 = (n_{cl}^2 - n_e^2)\rho_{cl}^2 \tag{16}$$

so that on rearranging:

$$n_e^2 = n_{cl}^2 - 2s(T^2 - 1)NA^2 \times (\rho_{co}\rho_{cl})^2 \tag{17}$$

where NA (the numerical aperture) $= (n_{co}^2 - n_{cl}^2)^{\frac{1}{2}}$

It can be seen from this expression (17) that, where the $n_{cl}$ value for the two fibers is substantially equal and their refractive index profile is of the $\alpha$ class (in which case $s_1 = s_2$), the requirement $n_{e1} = n_{e2}$ is met where the products $$(T^2 - 1) \frac{NA}{\rho_{co}/\rho_{cl}}$$

are equal. In the simple and typical case where the T values are equal, equality of the effective indices of the highest order modes during tapering requires that the ratio $NA/(\rho_{cl}/\rho_{co})$ be the same for both fibers.

The requirement that the $n_e$'s for the two fibers be identical for all taper ratios is obtained from (15) by setting $s=s_1$, $\rho_{co}=\rho_{co1}$, $\rho cl=\rho_{cl1}$ and $NA=NA_1$ for the throughput fiber, and $s=s_2$, $\rho_{co}=\rho_{co2}$, $\rho_{cl2}$ and $NA=NA_2$ for the tap-off fiber, all other quantities having common values This leads to:

$$\left(\frac{2\rho_{co2}}{2\rho_{co1}}\right)^2 = \frac{s_1}{s_2}\left(\frac{2\rho_{cl2}}{2\rho_{cl1}}\right)^2 \frac{NA_1^2}{NA_2^2} \quad (18)$$

which relates the core-diameter ratio to the cladding-diameter ratio.

On rearranging (10), the adiabatic case, the core diameter of the tap-off fiber is related to the core diameter of the throughput fiber by:

$$2\rho_{co2} = 2\rho_{co1}\left(\frac{s_1}{s_2}\right)^{\frac{1}{2}}(2t)^{\frac{1}{2}} \quad (19)$$

If we eliminate the ratio of core diameters from (18) and rearrange:

$$2\rho_{cl2}=2\rho_{cl1}(2t)^{\frac{1}{2}} \quad (20)$$

which is equivalent to the left-hand side of inequality (4a) above. It will be noted that the ratio of the cladding diameters of the two fibers is independent of the core diameters and refractive index profiles.

On rearranging (10'), the non-adiabatic case $$t = \frac{(\rho_{co2}/\rho_{co1})^2}{s_1/s_2 + (\rho_{co2}/\rho_{co1})^2} \quad (19')$$

substitute from (18) and rearranging gives:

$$\frac{\rho_{cl2}}{\rho_{cl1}} = \left(\frac{t}{1-t}\right)^{\frac{1}{2}} \quad (20')$$

which is the equivalent of the right-hand side of inequality (4a) above. Again, the ratio of the cladding diameters of the two fibers is independent of the core diameters and refractive index profiles.

Some particular cases will now be exemplified.

1. Identical Core Profiles

If the core profiles have the same shape, e.g. both step or both parabolic, then $s_1=s_2$ and $$\frac{\rho_{cl2}}{\rho_{cl1}} = \frac{\rho_{co2}}{\rho_{co1}}$$

in (19) (20) (19') and (20'), so that the cladding and core diameters are in the same proportion.

2. Parabolic Core (Throughput) & Step Core Tap-Off

In this case $\alpha_1$ is very large and $\alpha_2=2$. Equation (15) gives $s_1=\frac{1}{4}$ and $s_2=\frac{1}{2}$, whence (19) and (20) reduce to:

$$2\rho_{co2}2\rho_{co1}t^{\frac{1}{2}}; 2\rho_{cl2}=2\rho_{cl1}(2t)^{\frac{1}{2}}$$

so that the core of the tap-off fiber is relatively smaller than the cladding, consistent with the larger number of modes on the step-profile.

3. Step Core (Throughout) & Parabolic Core (Tap-Off)

We now have $s_1\frac{1}{2}$ and $S_2=\frac{1}{4}$, so that (19) and (20) give:

$$2\rho_{co2}=2\rho_{co}(4t)^{\frac{1}{2}}; 2\rho_{cl2}=2\rho_{cl1}(2t)^{\frac{1}{2}}$$

so that the core of the tap-off fiber is relatively larger than the cladding, consistent with the smaller number of modes on the parabolic profile.

Utilizing expressions (3a) and (4a), given the tap-off ratio, then all the core and cladding diameters of the two fibers are prescribed, with the exception of the ratio of cladding-to-core diameters for one of the fibers, which then uniquely determines this ratio for the other Fiber. In other words, there is one degree of freedom remaining, which will be determined by other considerations, such as bending loss, fiber rigidity, etc.

The limits for inequalities (4a) were determined above for equal T and NA values In a more general case, equation (17) may be utilized to obtain a predetermined or predictable power coupling factor where the NA and $\rho_{co}/\rho_{cl}$ values for the fibers are quite different It is still required that $n_{e1}=n_{e2}$ and equation (17) then indicates that the products $$(T^2-1)\frac{NA}{\rho_{co}/\rho_{cl}}$$

should be equal, assuming $n_{cl}$ are equal.

If one of the fibers is pretapered, the dissimilarity in NA and $\rho_{co}/\rho_{cl}$ ratio can be balanced, at least at one point in the drawing/tapering process, by creating a dissimilarity between the T values.

By way of example, an asymmetric coupler is made from fibers having respective $\rho_{co}/\rho_{cl}$ ratios of 208/250 and 100/140. The former is etched to 208/210 and latter to 100/105 only the smaller fiber is then pretapered to 67/70. The two fibers are twisted, fused and drawn in the known manner. According to equation (17), and using x for the ratio $$\frac{NA^2}{\rho_{co}^2/\rho_{cl}^2}$$

For 208/210 etched fiber $x=0.157$ $T^2=1=15$ at completion of tapering Thus the product $(T_2-1)x$ is $x(T^2-1)=2.36$ For 100/105 etched fiber $x=0.0763$ Pretapered to 67/70 $T^2-1=30.4$ at completion of tapering.

Thus the product is $x.(T^2-1)=2.32$

Thus, at the completion of fiber tapering when the required coupling is achieved, and the original taper ratio of the bus fiber is the same as in previous couplers not subject to this technique, the products of x and $T^2-1$ are essentially equal, so that the $n_e$'s for both fibers are equal Note that the $n_e$'s are not equal throughout the whole of the tapering process. They are equal at only one moment, and it is the ability to predict this moment as the moment when the required optical performance occurs that is provided by equation (17).

It will be appreciated that equation (17) may be applied to predict the nominal optical performance of two fibers assembled into a coupler, or to design and construct an asymmetric coupler of normal optical performance from two fibers of arbitrary dimensions and optical parameters.

It is thus important to appreciate that the concepts enunciated in the above mathematical exposition are not confined to the special cases discussed herein i.e. similar peak core and cladding refractive indices, a particular family of refractive index profiles and biconical taper couplers In particular, equations (8), (9), (16) and (17) have general application and the invention in its most general aspects provides a method of designing and/or forming a fiber optic coupler in accordance with these equations and their precursors and derivatives.

FIG. 1 is an exemplary graphical expression of the relationship of the various parameters at different $\alpha_1$ values for $\alpha_2 = 2.0$. The following two examples indicate how the graph, or like graphs for other circumstances, may be employed.

A. Given $\alpha_1/\alpha_2$ and the core ratio between the fibers proceed as follows:
1. Locate core ratio on vertical axis.
2. Draw horizontal line and intersect appropriate $\alpha_1/\alpha_2$ curve.
3. Draw vertical line from this intersection to horizontal split ratio axis.
4. This is the maximum split ratio for the coupler.
5. Note the intersection of the vertical line with the $\alpha_1/\alpha_2 = 1$ curve.
6. Draw a horizontal line to the vertical axis.
7. This gives the cladding ratio for the two fibers.

Note the large fiber is always the main fiber, and the smaller fiber the tap.

B. Conversely, given any split ratio and $\alpha_1/\alpha_2$:
1. Draw a vertical line to the intersection of $\alpha_1/\alpha_2 = 1.0$ curve.
2. This intersection gives cladding ratio.
3. Continue the vertical line to intersect the appropriate $\alpha/\alpha$ curve.
4. This intersection gives the core ratio.

The invention will now be further described, by way of an exemplary embodiment only, with reference to the accompanying diagrams depicting the principal physical steps of a preferred method of actually fabricating fibers once the fibers have been selected in accordance with the invention, showing the form of the optical fibers at the conclusion of each step. In this exemplary embodiment, for simplicity, the adiabatic limit is selected as satisfactory. Two lengths 10,11 of optical fiber, for example multi-mode silica fiber with a germanium-doped core 26, are first stripped of their outer protective coating 14 in respective portions 12, 13 (STEP A.). Fiber 10 is to be the bus fiber in the subsequent coupler and has a core radius $r_1$ of 100 micron and an outer cladding radius $r_2$ of 125 micron, a ratio of 0.8. The desired power coupling ratio is 1%, so fiber 11, which is to form the tap fiber, has a core radius $r_1$ of 36 micron (as required by the left-hand side of inequality (3)) and an outer cladding radius $r_2$ of 38 micron. The numerical aperture for each fiber is: $NA_1 = 0.4$ and $NA_2 = 0.27$. The parabolic core refractive index profiles are characterized by: $\alpha_1 = 3.1$ and $\alpha_2$ is 2.0, with $S_1 = 0.61$ and $S_2 = 0.25$.

Fiber portion 13 is immersed in a bath of, for example, hydrofluoric acid at say, ambient temperature to etch the silica cladding 25 within a segment 17 and so increase the ratio of core radius to outer cladding radius to a value equal to that as required by expressions (3) and (4), (STEP B). Residence time in the bath is generally dependent on the exact nature of the acid employed, but might be significantly reduced by employing hot and/or flowing acid.

The two fibers are then laid parallel about 0.5 to 1.0 mm apart by being held in a pair of clamps 18, 20 so that the segment 17 and a matching segment 16 of fiber portion 12, extend under tension side-by-side (STEP C.). One clamp 18 is rotated to twist the fiber segments together in intimate side-by-side contact (STEP D.). The intimately contacted and initially tensioned fiber segments are then heated sufficiently to soften and fuse the fibers together to form a join 30 (STEP E.).

To cause the cores 26 to form respective biconical tapers 23, the fibers are longitudinally drawn equally and oppositely, and the coupler is complete (STEP F.). It may now be packaged and/or encapsulated by known methods to render it resistant to hostile environments as well as robust and shock resistant. During drawing, the radii of core and cladding both diminish considerably but their ratio remains substantially constant.

In an actual example in close conformity with the above exemplary embodiment, the final values of core and cladding radii $r_1$ and $r_2$ were found to be 16 microns and 22 microns respectively for the bus branches and 8 microns and 12 microns respectively for the tap branches. The tap-off power coupling factor was measured and observed to be 0.08, very close to the desired factor of 0.1. The tap-on power coupling factor was 0.70.

We claim:

1. A method of fabricating an asymmetric multi-mode fiber optic coupler comprising assembling the coupler from two or more multi-mode optical fibers of different core and cladding diameters but substantially equal cladding refractive indices, and wherein the fibers are selected so as to have substantially equal effective refractive indices for their respective highest-order cladding modes, at least in the fabricated coupler.

2. A method according to claim 1 for fabricating an asymmetric multi-mode fiber optic coupler having a predetermined or predictable power coupling factor, wherein said optical fibers are selected in regard to their numerical apertures NA, and their core-to-cladding radii ratios $\rho_{co}/\rho_{cl}$ and subjected to respective taper ratios T so that, on assembly of the fibers to form the coupler, the products $$(T^2 - 1)\frac{NA^2}{\rho_{co}^2/\rho_{cl}^2}$$

for the respective fibers are at least momentarily equal.

3. A method according to claim 1 or 2 wherein said optical fibers further have similar peak core refractive indices.

4. A method according to claim 3 wherein said optical fibers are formed in like material and of similar numerical aperture, whereby to have said similar cladding and peak core refractive indices.

5. A method according to claim 4 wherein said optical fibers are silica optical fibers and have substantially identical numerical apertures in the range 0.2 to 0.5.

6. A method according to claim 1 or 2 for fabricating an asymmetric multi-mode fiber optic coupler having a predetermined or predictable power coupling factor, wherein the ratio of the core diameters is selected from a first range determined by a first inequality dependent upon said power coupling factor and upon the refractive index profiles of the fiber cores, and the ratio of the cladding diameters is selected from a second range determined by a second inequality dependent upon the power coupling factor but independent of the core diameters and the refractive index profiles.

7. A method according to claim 6 wherein the limits of said inequalities are determined by strict adiabatic and non-adiabatic behavior respectively, and the said selections are made relatively close to the non-adiabatic limit.

8. A method according to claim 6 for fabricating a fused biconical taper fiber optic coupler, wherein both the ratio of the core diameters and the ratio of the cladding diameters are proportional to the square root of the power coupling factor, with a constant of proportionality of $(2)^{\frac{1}{2}}$, but the core diameter ratio is typically further proportional to a complex factor of the refractive index profile.

9. A method according to claim 8 wherein the optical fibers exhibit refractive index profiles, the $\alpha$ profiles, defined by:

$$n^2(r) = n_{co}^2[1 - 2\Delta(r/\rho)^\alpha]$$

wherein $n(r)$ is the refractive index at radial distance r from the core axis, $n_{co}$ is the peak core refractive index, $\rho$ is the core radius, $\alpha$ is a parameter indicative of the particular refractive index profile, and $\Delta$ is the relative index difference given by $$2\Delta = 1 - (n_{cl}/n_{co})^2$$

wherein $n_{cl}$ is the cladding refractive index, the power coupling factor is a power tap-off coupling factor t from a main or bus fiber to a tap or branch fiber, and said first inequality is the following, or an equivalent:

$$\tfrac{1}{2} \frac{S_2}{S^1} \frac{V_2^2}{V_1^2} < t < \frac{S_2 V_2^2}{S_1 V_1^2 + S_2 V_2^2}$$

where $S = \tfrac{1}{2} \frac{\alpha}{\alpha + 2}$ and $V = \frac{2\pi \rho_{co}}{\lambda} (n_{co}^2 - n_{cl}^2)^{\frac{1}{2}}$ the main or bus fiber is indicated by subscript 1 and the tap or branch fiber by subscript 2, and $\lambda$ is the free space wavelength of a prescribed source.

10. A method according to claim 9 wherein the numerical apertures of the fibers are substantially equal and said first and second inequalities are the following, or equivalents $$\tfrac{1}{2} \frac{S_2}{S_1} \left( \frac{\rho_{co2}^2}{\rho_{co1}} \right) < t < \frac{(\rho_{co2}/\rho_{co1})^2}{\frac{S_1}{S_2} + (\rho_{co2}/\rho_{co1})^2}$$

and $$(2t)^{\frac{1}{2}} > \frac{\rho_{cl2}}{\rho_{cl1}} > \left( \frac{t}{1-t} \right)^{\frac{1}{2}}$$

11. A method according to claim 2 including the steps of heating said segments of the fibers while these segments are in intimate side-by-side contact to a temperature sufficient to cause the fiber segments to fuse together, and longitudinally drawing the heated fibers to cause each of the fused fiber segments to develop a biconical taper and so form a coupler.

12. A method according to claim 2 wherein the values of NA and $\rho_{co}/\rho_{pl}$ differ for the respective fibers and one of the fibers is subjected to a pretapering before the fibers are drawn and thereby tapered together, whereby the values of T vary for the fibers in a manner to ensure equality of said product.

13. An asymmetric multi-mode fiber optic coupler fabricated by the method of claim 2.

14. An asymmetric multi-mode fiber optic coupler fabricated by the method of claim 1.

15. An asymmetric multi-mode fiber optic couPler having at least four optical fiber branches of at least two different core and cladding diameters but substantially equal cladding refractive indices, wherein the fiber branches further have substantially equal effective refractive indices for their respective highest order cladding modes.

* * * * *